United States Patent
Zhang (10) Patent No.: US 10,295,221 B2
(45) Date of Patent: May 21, 2019

(54) WINDOW TYPE AIR CONDITIONER RACK (71) Applicant: Mingsen Zhang, Fujian (CN)

(72) Inventor: Mingsen Zhang, Fujian (CN)

(*) Notice: Subject to any disclaimer, the term of this patent is extended or adjusted under 35 U.S.C. 154(b) by 0 days.

(21) Appl. No.: 15/694,871

(22) Filed: Sep. 4, 2017

(65) Prior Publication Data

US 2019/0056143 A1 Feb. 21, 2019

(30) Foreign Application Priority Data

Aug. 17, 2017 (CN) .......................... 2017 1 0707714

(51) Int. Cl.
| | |
|---|---|
| *F24F 13/32* | (2006.01) |
| *F24F 1/02* | (2019.01) |
| *F16M 13/02* | (2006.01) |
| *E04G 3/18* | (2006.01) |
| *E06B 7/28* | (2006.01) |
| *A47B 45/00* | (2006.01) |

(52) U.S. Cl.
CPC ............. *F24F 13/32* (2013.01); *F16M 13/02* (2013.01); *A47B 45/00* (2013.01); *E04G 3/18* (2013.01); *F24F 1/02* (2013.01); *F24F 2221/20* (2013.01)

(58) Field of Classification Search
CPC ... A47B 45/00; F24F 13/32; F24F 1/02; F24F 1/027; F24F 2221/20; F16M 13/022; E04G 3/18
USPC ........ 248/208, 241, 674, 678, 670; 454/204; 312/101; 62/262; 182/53, 57, 61, 62
See application file for complete search history.

(56) References Cited

U.S. PATENT DOCUMENTS

| | | | | |
|---|---|---|---|---|
| 8,091,844 B1 * | 1/2012 | Bragg | ...................... | F24F 13/32 248/208 |
| 8,584,998 B1 * | 11/2013 | Peterson | .................. | F24F 13/32 182/62 |
| 9,163,854 B2 * | 10/2015 | Arbucci | .................... | E06B 7/28 |
| 9,303,895 B1 * | 4/2016 | Grant | ....................... | F24F 13/32 |
| 9,605,870 B2 * | 3/2017 | Darby | ................... | F16M 13/022 |

* cited by examiner

*Primary Examiner* — Tan Le (57) ABSTRACT

A window type air conditioner rack, having an upper frame main rack and a diagonal bracing rack inserted to the upper frame main rack; the diagonal bracing rack is adjustably fixed inside the upper frame main rack; the upper frame main rack has a windowsill connection assembly and horizontal supporting pillars fixedly mounted to the an outer side of the windowsill connection assembly.

6 Claims, 6 Drawing Sheets

WINDOW TYPE AIR CONDITIONER RACK

BACKGROUND OF THE INVENTION

The present invention relates to a window type air conditioner rack.

In searing summer, a vast majority of the northern China and also the southern China are covered by sweltering and unbearable heat that is torturing. However, as the quality of life is improving, a household air conditioner can be mounted to resist the heat of summer. Yet, while mounting the household air conditioner outdoor, a horizontal supporting pillar and a seat of the mounting rack should be fixed to the window frame via self-tapping screws. In this case, holes must be drilled on the horizontal supporting pillar and the seat made of plastic for fixation. This practice consumes time and energy. The horizontal supporting pillar and diagonal bracings are fixed by screws. Appropriate holes should be selected for fixation in order to maintain the horizontal supporting pillar in a horizontal position. Further, lower ends of the diagonal bracings attach firmly to a wall surface to fix a support rack positioned above, and in order to select appropriate holes, mechanics mounting the air conditioner on a high rising building should lean outside of a window to drill holes, thereby placing their own safety as risk, and the holes may not be accurately drilled and thus affect the aesthetic appearance of the mounted air conditioner.

BRIEF SUMMARY OF THE INVENTION

It is an object of the present invention to provide a window type air conditioner rack which is simple to mount, easy to adjust, reliable and convenient to use.

The present invention has the following technical scheme:

The present invention comprises an upper frame main rack and a diagonal bracing rack inserted to the upper frame main rack; the diagonal bracing rack is adjustably fixed inside the upper frame main rack; the upper frame main rack comprises a windowsill connection assembly and horizontal supporting pillars fixedly mounted to the an outer side of the windowsill connection assembly.

The horizontal supporting pillars comprise a left horizontal supporting pillar and a right horizontal supporting pillar which are arranged in parallel and are structurally the same; one end of the left horizontal supporting pillar and one end of the right horizontal supporting pillar are fixed to the outer side of the windowsill connection assembly; another end of the left horizontal supporting pillar and another end of the right horizontal pillar are fixedly connected with each other through a connection pillar; each of the left horizontal supporting pillar and the right horizontal supporting pillar has a C shape forming a slot having an opening that faces downwardly; two side panels of each of the left horizontal supporting pillar and the right horizontal supporting pillar are each provided with outer adjustment holes evenly arranged in intervals; the diagonal bracing rack has two identical sides, and each side comprises a U shaped plate forming a slot with an opening facing upwardly and a support rack provided at a bottom outer side of the U shaped plate; the support rack is positioned in an inclined manner; a bottom end of the support rack is fixedly mounted with a wall supporting plate; fixation holes are provided correspondingly on two side boards of the U shaped plate; a U shaped or V shaped resilient piece is provided inside the slot of the U shaped plate; two outer panels of the U shaped or V shaped resilient piece are each provided with a positioning bead; the positioning beads of the two outer panels correspond to each other; the positioning beads are inserted through the fixation holes; when the positioning beads are pressed into inner sides of the fixation holes, and each U shaped plate is inserted into the left horizontal supporting pillar and the right horizontal supporting pillar respectively, each U shaped plate is slidable in the slot of the corresponding C shaped horizontal supporting pillar; once an outer surface of the wall supporting plate engages firmly with a wall such that the upper frame main rack is positioned horizontally parallel to the level ground, the positioning beads are released and inserted into corresponding outer adjustment holes.

An outer side wall of the wall supporting plate is parallel to the wall; the outer side wall of the wall supporting plate is also provided with a plastic gasket; a side wall of the plastic gasket has an uneven surface.

The windowsill connection assembly comprises a windowsill rail, two rows of positioning holes symmetrically arranged on two ends of a side wall of the windowsill rail respectively, and a left adjustment tube and a right adjustment tube inserted to two ends of a cavity of the windowsill rail respectively; one end of the left adjustment tube and one end of the right adjustment tube facing towards each other are each positioned on an outer side thereof a second positioning bead insertable to a corresponding positioning hole.

The windowsill connection assembly has a length of 24-38 inches; the windowsill rail is a hollow square tube or has a C shape forming a slot; the left adjustment tube and the right adjustment tube are hollow square tubes inserted to the windowsill rail and moveable within the windowsill rail.

A second V shaped resilient piece is provided inside each of the left adjustment tube and the right adjustment tube; the second positioning bead is mounted on a side of the second V shaped resilient piece corresponding to the positioning holes; the second positioning beads pass through through holes of respective side walls of the left adjustment tube and the right adjustment tube and insert into corresponding positioning holes.

A vertical bended plate is fixed to each of a left end and right end of the windowsill rail at a side of the windowsill rail opposite to the side of the windowsill rail provided with the positioning holes; said one end of the left horizontal supporting pillar and said one end of the right horizontal supporting pillar are each fixedly connected to an upper plate of a corresponding vertical bended plate.

Each of the horizontal supporting pillars has a C shape forming a slot having an opening facing downwardly; a row of adjustment holes evenly distributed in intervals is arranged on each of two side panels of the slot of each horizontal supporting pillar; a front bottom side of each horizontal supporting pillar is fixed with two ears; an installation hole is provided on each ear; the windowsill connection assembly comprises a U shaped mounting plate; a second installation hole is provided on each of two side panels of the U shaped mounting plate; a bottom panel of the U shaped mounting plate is provided with two screw holes; more than one height forming block is provided on an outer bottom side of the U shaped mounting plate; the height forming block is fixed to the wall by using screws passing through the screw holes; the U shaped mounting plate is installed between the two ears; an adjustment bolt passes through the installation holes and the corresponding second installation holes connecting a corresponding horizontal supporting pillar with the windowsill connection assembly; the diagonal bracing rack comprises an inclined supporting rack and a wall supporting plate fixedly mounted at a bottom end of the inclined supporting rack; a triangular supporting ear is mounted at an upper portion of each of two side panels of the inclined supporting rack; two upper adjustment holes are provided on each triangular supporting ear, and the two upper adjustment holes on each triangular supporting ear are arranged in a staggered manner with respect to the corresponding adjustment holes; the triangular supporting ears are mounted in between two side panels of each of the horizontal supporting pillars; a second adjustment bolt passes through a pair of adjustment holes at the two side panels of the horizontal supporting pillar and a pair of corresponding upper adjustment holes.

A spirit level is mounted on a top surface of each horizontal supporting pillar; the height forming block is made of plastic; each height forming block has a height of 0.4-0.41 inch and a width of 0.95-1 inch.

Adjustment of a distance between two adjacent adjustment holes and a distance between the corresponding upper adjustment holes cause each C shaped horizontal supporting pillar to tilt less than 1.5 degrees with respect to the level ground.

The present invention has the following beneficial advantages: each of the horizontal supporting pillars has a C shape forming a slot; the horizontal supporting pillars comprise a left horizontal supporting pillar and a right horizontal supporting pillar to achieve balance between two sides; during installation, the positioning beads are pressed inwardly, and the U shaped plates of the diagonal bracing rack are inserted into the left horizontal supporting pillar and the right horizontal supporting pillar respectively and slidable inside the left horizontal supporting pillar and the right horizontal supporting pillar respectively until the side walls having uneven surfaces of the plastic gaskets of the wall supporting plates engage tightly with the wall surface such that the left horizontal supporting pillar and the right horizontal supporting pillar are positioned parallel to the level ground; by means of the resilience of the U shaped or V shaped resilient pieces, the positioning beads are released and inserted into the corresponding outer adjustment holes of the left horizontal supporting pillar and the right horizontal supporting pillar through the corresponding fixation holes to firmly secure the horizontal supporting pillars; when adjustment is required, press the positioning beads inwardly again, and the positioning beads will disengage from the fixation holes under the resilience of the U shaped or V shaped resilient pieces; the U shaped plates slide to adjust the positions thereof in the slots of the C shaped horizontal supporting pillars; as such, the tiring and time consuming procedures of fixing screws can be saved, thereby facilitating the mounting and adjustment of the upper frame main rack.

Likewise, the windowsill connection assembly is adjustable after being inserted or snapped in a frame or a slot of a window. It is not necessary to drill holes on the wall by using electrical tools. Therefore, the present invention is time and effort saving, highly accurate and easy to adjust. The two upper adjustment holes on each side panel of the inclined supporting rack are arranged in a staggered manner with respect to the corresponding adjustment holes. Even when different upper adjustment holes are used, the horizontal supporting pillars will be tilted by less than 1.5 degrees with respect to the level ground. Therefore, the present invention can be firmly and stably installed. During installation, the positioning beads can be replaced by bolts.

The present invention is reliable, convenient to install and uninstall, and has a compact structure, thereby increasing the efficiency of installing an air conditioner.

DETAILED DESCRIPTION OF THE INVENTION

Embodiment 1

Figure 1:
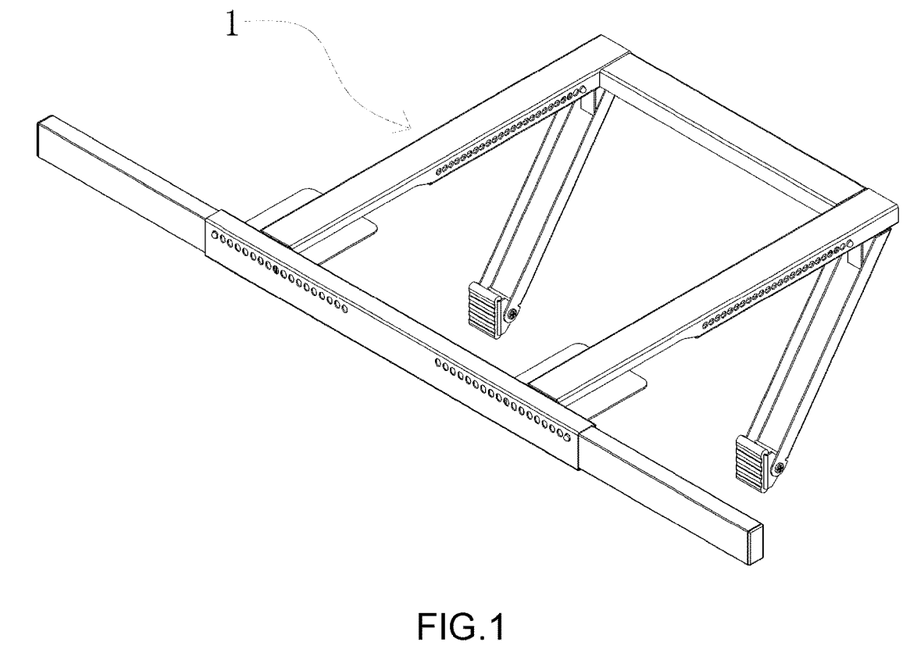
FIG. 1 is a structural view of the present invention.
Figure 2:
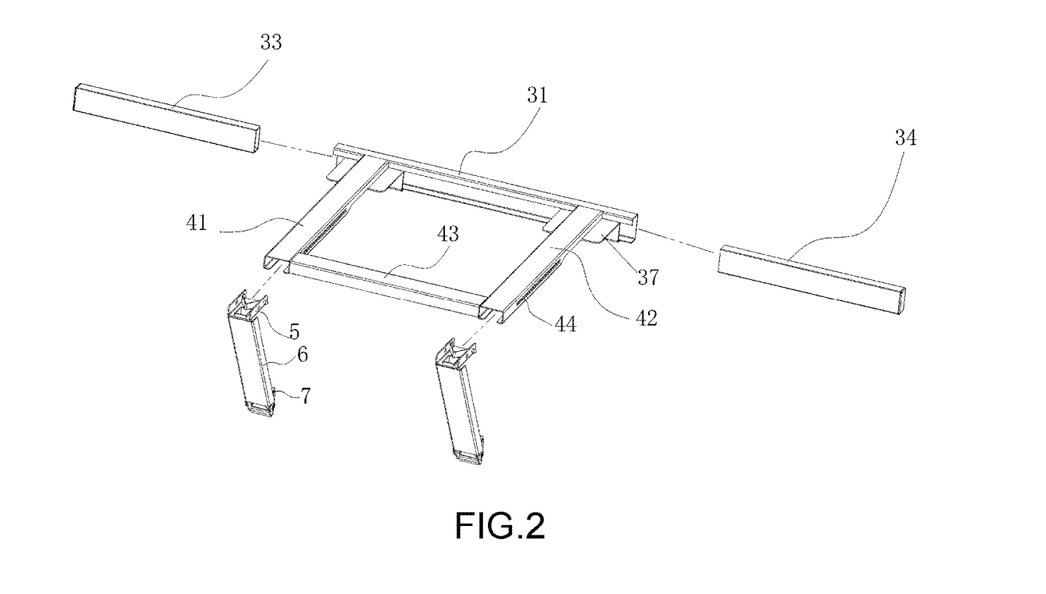
FIG. 2 is an exploded view of the present invention.
Figure 3:
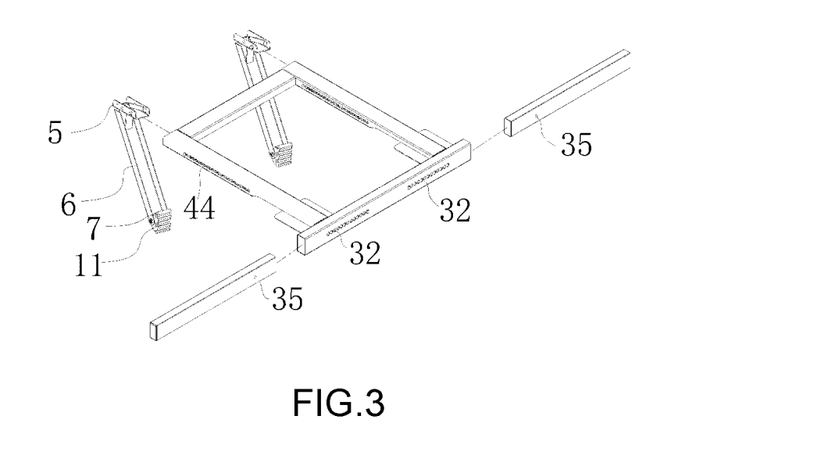
FIG. 3 is an exploded view of the windowsill connection assembly according to the present invention.
Figure 4:
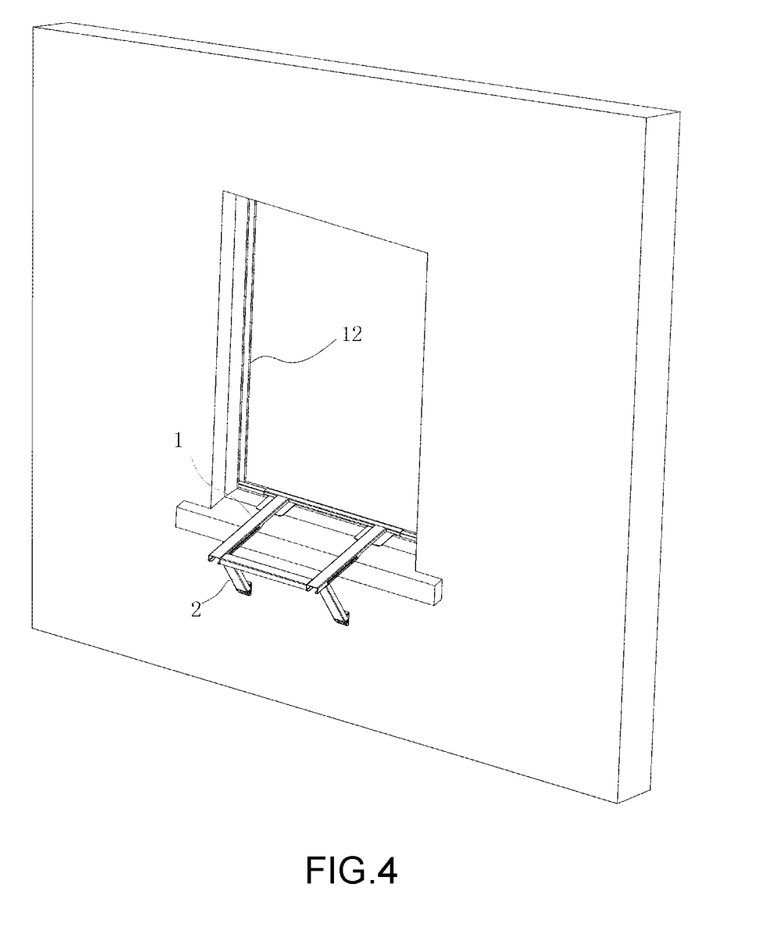
FIG. 4 is a structural view showing installation of the present invention at an outer wall surface.
Figure 5:
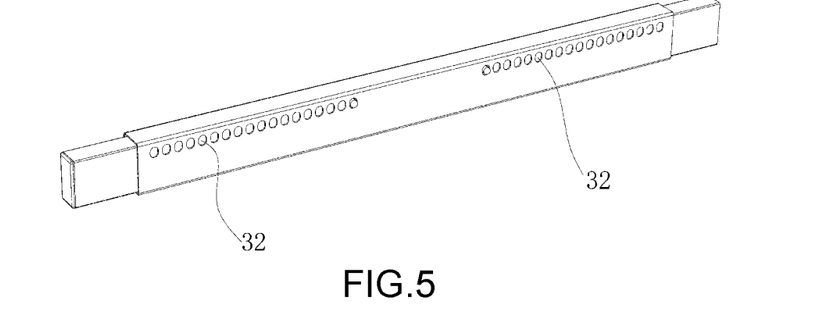
FIG. 5 is a structural view of the windowsill connection assembly.
Figure 6:
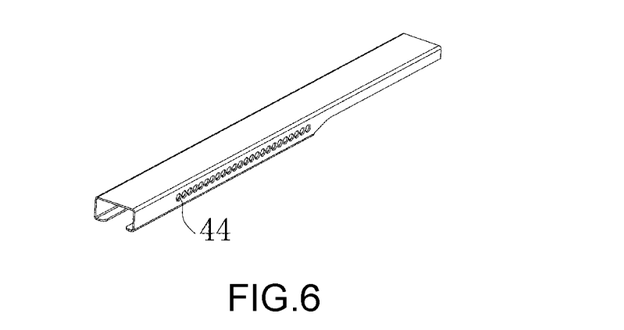
FIG. 6 is a structural view of the left horizontal supporting pillar or the right horizontal supporting pillar.
Figure 7:
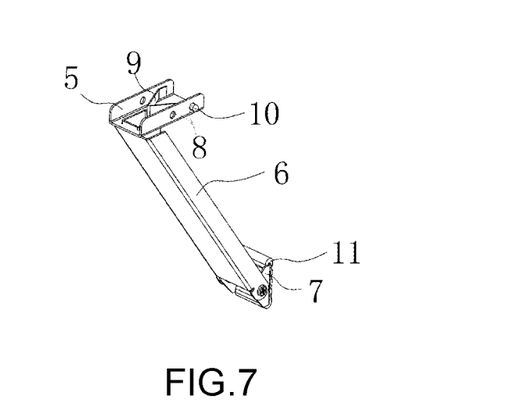
FIG. 7 is a structural view of the diagonal bracing rack.
Figure 8:
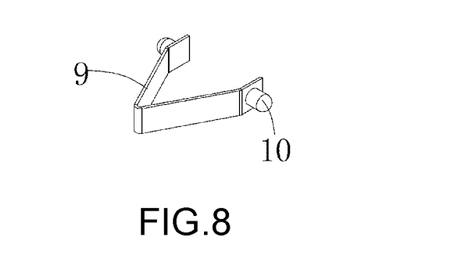
FIG. 8 is a structural view of a U shaped or V shaped resilient piece.
Figure 9:
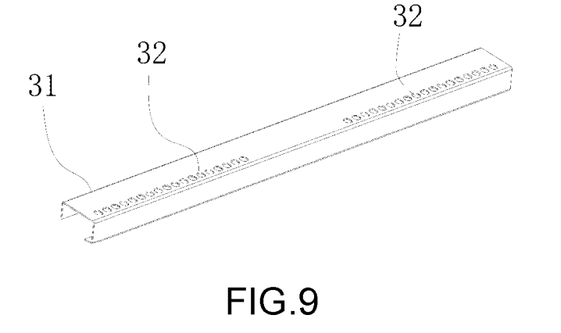
FIG. 9 is a structural view of a windowsill rail.
Figure 10:
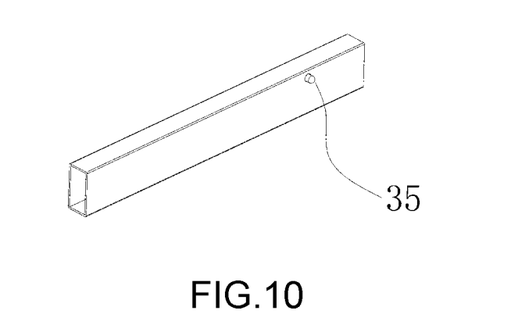
FIG. 10 is a structural view of a left adjustment tube or a right adjustment tube.
Figure 11:
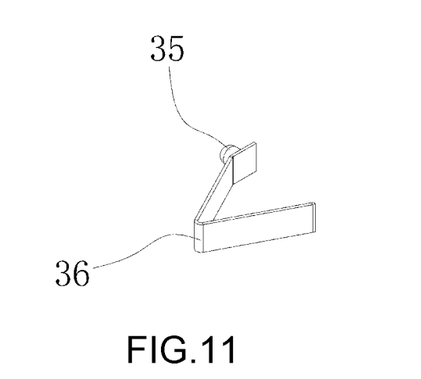
FIG. 11 is a structural view of a second V shaped resilient piece.

As shown in FIGS. 1-11, the present invention comprises an upper frame main rack 1 and a diagonal bracing rack inserted to the upper frame main rack 1; the diagonal bracing rack is slidable within the upper frame main rack 1 so as to be adjusted and fixed; the upper frame main rack 1 comprises a windowsill connection assembly having an adjustable length, and horizontal supporting pillars fixedly mounted to the an outer side of the windowsill connection assembly; the horizontal supporting pillars comprise a left horizontal supporting pillar 41 and a right horizontal supporting pillar 42 which are arranged in parallel and are structurally the same; one end of the left horizontal supporting pillar 41 and one end of the right horizontal supporting pillar 42 are fixed to the outer side of the windowsill connection assembly; another end of the left horizontal supporting pillar 41 and another end of the right horizontal supporting pillar 42 are fixedly connected with each other through a connection pillar 43; each of the left horizontal supporting pillar 41 and the right horizontal supporting pillar 41 has a C shape forming a slot having an opening that faces downwardly; two side panels of each of the left horizontal supporting pillar 41 and the right horizontal supporting pillar 42 are each provided with outer adjustment holes 44 evenly arranged in intervals; the left horizontal supporting pillar 41 and the right horizontal supporting pillar 42 are each connected to a vertical bended plate 37; the diagonal bracing rack has two identical sides, and each side comprises a U shaped plate 5 forming a slot with an opening facing upwardly and a support rack 6 provided at a bottom outer side of the U shaped plate 5; the support rack 6 is positioned in an inclined manner; a bottom end of the support rack 6 is fixedly mounted with a wall supporting plate 7; an outer side wall of the wall supporting plate 7 is parallel to a wall; the outer side wall of the wall supporting plate 7 is also provided with a plastic gasket 11; a side wall of the plastic gasket 11 has an uneven surface, so that the wall supporting plate 7 and the wall can be firmly engaged; fixation holes 8 are provided correspondingly on two side boards of the U shaped plate 5; a U shaped or V shaped resilient piece 9 is provided inside the slot of the U shaped plate 5; two outer panels of the U shaped or V shaped resilient piece 9 are each provided with a positioning bead 10; the positioning beads of the two outer panels correspond to each other; the positioning beads 10 are inserted through the fixation holes 8; when the positioning beads 10 are pressed into inner sides of the fixation holes 8, and the U shaped plate 5 is inserted into one of the left horizontal supporting pillar 41 and the right horizontal supporting pillar 42, the U shaped plate 5 is slidable in the slot of the C shaped left horizontal supporting pillar 41 or the C shaped right horizontal supporting pillar 42; once the uneven surface of the side wall of the plastic gasket 11 of the wall supporting plate 7 engages firmly with the wall such that the upper frame main rack 1 is positioned horizontally parallel to the level ground, the positioning beads 10 are released and inserted into corresponding outer adjustment holes 44.

The windowsill connection assembly of the present invention has a length of 24-38 inches. The windowsill connection assembly comprises a windowsill rail 31, two rows of positioning holes 32 symmetrically arranged on two ends of a side wall of the windowsill rail 31 respectively, and a left adjustment tube 33 and a right adjustment tube 34 inserted to two ends of a cavity of the windowsill rail 31 respectively. One end of the left adjustment tube 33 and one end of the right adjustment tube 34 facing towards each other are each positioned on an outer side thereof a second positioning bead 35 insertable to a corresponding positioning hole 32; a second V shaped resilient piece 36 is provided inside each of the left adjustment tube 33 and the right adjustment tube 34; the second positioning bead 35 is mounted on a side of the second V shaped resilient piece 36 corresponding to the positioning holes 32; the second positioning beads 35 pass through through holes of respective side walls of the left adjustment tube 33 and the right adjustment tube 34 and insert into corresponding positioning holes 32. The windowsill rail 31 is a hollow square tube or has a C shape forming a slot; the left adjustment tube 33 and the right adjustment tube 34 are hollow square tubes inserted to the windowsill rail 31 and moveable within the windowsill rail 31. The vertical bended plate 37 is fixed to each of a left end and right end of the windowsill rail 31 at a side of the windowsill rail 31 opposite to the side of the windowsill rail 31 provided with the positioning holes 32. Said one end of the left horizontal supporting pillar 41 and said one end of the right horizontal supporting pillar 42 are each welded to an upper plate of a corresponding vertical bended plate 37.

As shown in FIGS. 1-11, during installation of the present invention, the second positioning beads 35 are pressed inwardly so as to insert the left adjustment tube 33 and the right adjustment tube 34 into the windowsill through left and right ends of the windowsill rail 31 respectively. The windowsill rail 31 has a width of 0.95-1 inch and thus enables itself to be placed inside a slot of a window 12, or placed on a side of a window outer frame facing an inner wall. Press the second positioning beads 35 inwardly again, and the left adjustment tube 33 and the right adjustment tube 34 inserted to the windowsill rail 31 will slide inside the windowsill rail until the left adjustment tube and the right adjustment tube abut tightly against two opposite edges of the window 12 respectively. Release the second positioning beads 35 so that the second positioning beads 35 pass through the through holes on the side walls of the left adjustment tube 33 and the right adjustment tube 34 and then insert into corresponding positioning holes 32. Accordingly, the windowsill connection assembly 3 can be fixed to the window. The left adjustment tube 33 and the right adjustment tube 34 inserted into the windowsill slide from a middle part of the windowsill towards two opposite ends of the windowsill respectively to fit with a window having a width ranging from 24 to 38 inches. The horizontal supporting pillars are positioned nearly parallel to the level ground; press the positioning beads 10 inwardly so as to insert the U shaped plates 5 into the left horizontal supporting pillar 41 and the right horizontal supporting pillar 42 respectively; The U shaped plates 5 in the slots of the C shaped left horizontal supporting pillar 41 and the right horizontal supporting pillar 42 slide toward the wall, until the side walls of the plastic gaskets 11 having an uneven surface of the wall supporting plates 7 engage tightly with the wall surface, and when the left horizontal supporting pillar 41 and the right horizontal supporting pillar 42 reach a position parallel to the level ground, release the positioning beads 10 to allow the positioning beads 10 to be inserted into the corresponding outer adjustment holes 44 of the left horizontal supporting pillar 41 and the right horizontal supporting pillar 42 under the resilient force of the U shaped or V shaped resilient pieces 9. Accordingly, the installation of the present invention is completed.

Each of the horizontal supporting pillars has a C shape forming a slot; the horizontal supporting pillars comprise a left horizontal supporting pillar and a right horizontal supporting pillar to achieve balance between the two sides; during installation, the positioning beads 10 are pressed inwardly, and the U shaped plates 5 of the diagonal bracing rack 2 are inserted into the left horizontal supporting pillar and the right horizontal supporting pillar respectively and slidable inside the left horizontal supporting pillar and the right horizontal supporting pillar respectively until the side walls having uneven surfaces of the plastic gaskets 11 of the wall supporting plates 7 engage tightly with the wall surface such that the left horizontal supporting pillar and the right horizontal supporting pillar are positioned parallel to the level ground; by means of the resilience of the U shaped or V shaped resilient pieces 9, the positioning beads 10 are released and inserted into the corresponding outer adjustment holes 44 of the left horizontal supporting pillar 41 and the right horizontal supporting pillar 42 through the corresponding fixation holes 8 to firmly secure the horizontal supporting pillars 4; when adjustment is required, press the positioning beads 10 inwardly again, and the positioning beads 10 will disengage from the fixation holes 8 under the resilience of the U shaped or V shaped resilient pieces 9; the U shaped plates 5 slide to adjust the positions thereof in the slots of the C shaped horizontal supporting pillars such that the upper main rack reaches a position parallel to the level ground.

The present invention is reliable, convenient to install and uninstall, and has a compact structure, thereby increasing the efficiency of installing an air conditioner.

Embodiment 2

Figure 12:
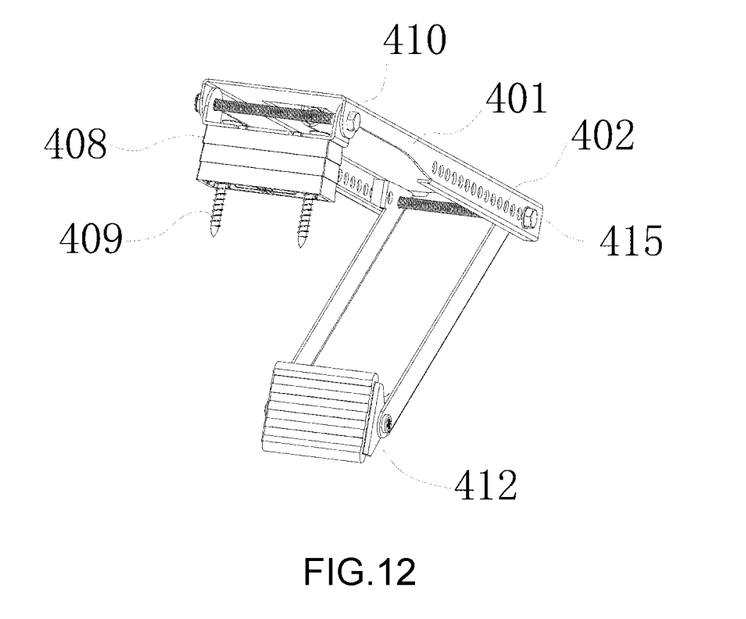
FIG. 12 is a structural view of a second embodiment of the present invention.
Figure 13:
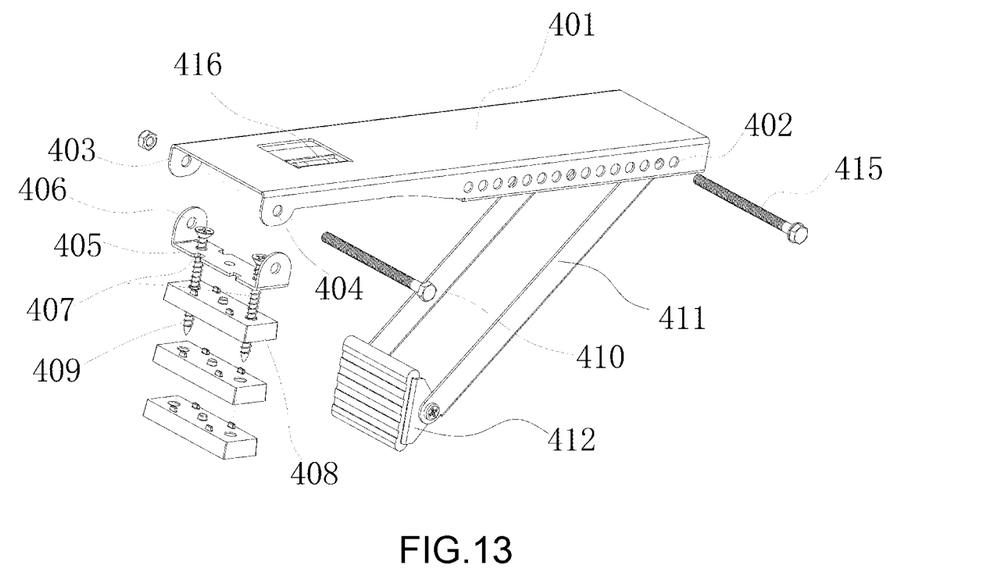
FIG. 13 is an exploded view of the second embodiment.
Figure 14:
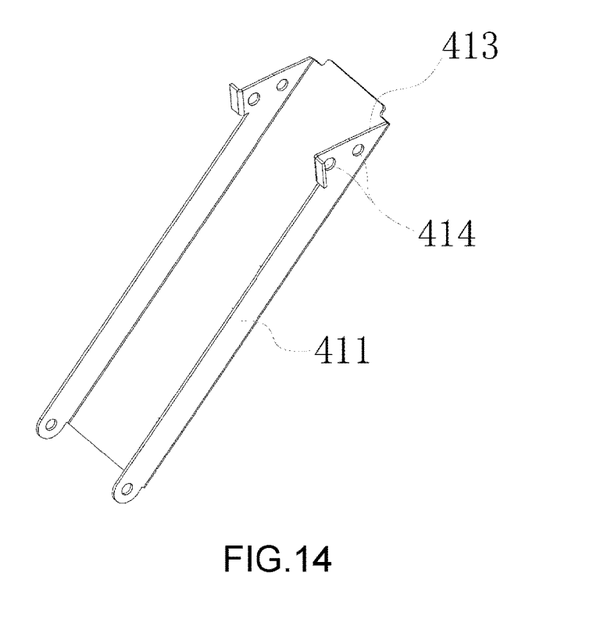
FIG. 14 a structural view of an inclined supporting rack.
Figure 15:
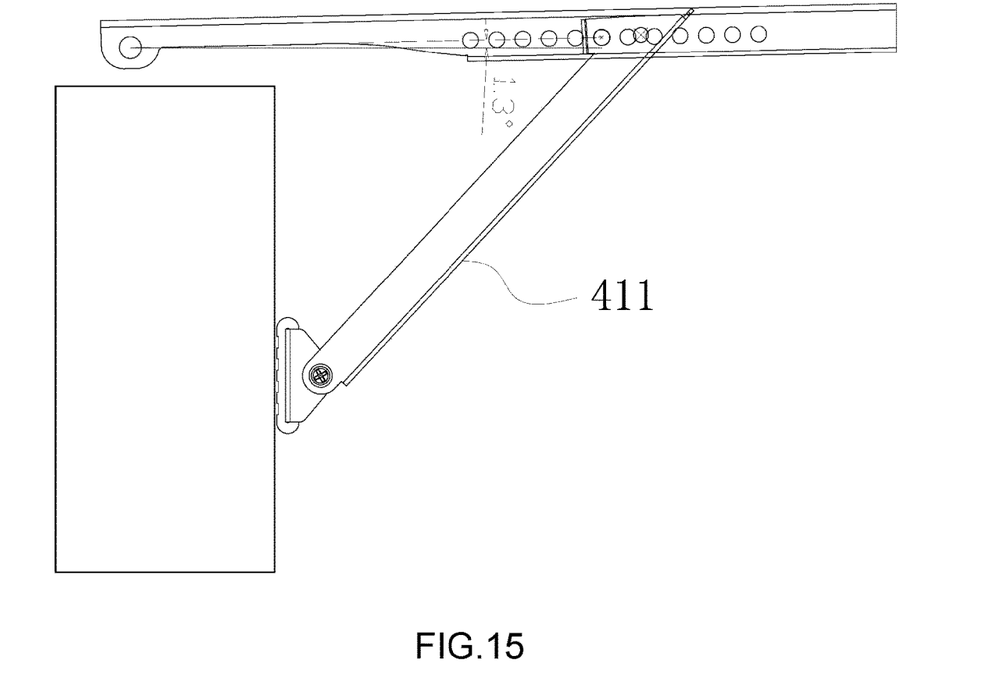
FIG. 15 is a structural view showing an installed condition of the second embodiment.

As shown in FIGS. 1, 12-15, each of the horizontal supporting pillars 401 has a C shape forming a slot having an opening facing downwardly; a row of adjustment holes 402 evenly distributed in intervals is arranged on each of two side panels of the slot of each horizontal supporting pillar; a front bottom side of each horizontal supporting pillar is fixed with two ears 403; an installation hole 404 is provided on each ear 403; the windowsill connection assembly comprises a U shaped mounting plate 405; a second installation hole 406 is provided on each of two side panels of the U shaped mounting plate 405; a bottom panel of the U shaped mounting plate 405 is provided with two screw holes 407; more than one height forming block 408 is provided on an outer bottom side of the U shaped mounting plate 405; the height forming block 408 is fixed to the wall by using screws 409 passing through the screw holes 407; the U shaped mounting plate 405 is installed between the two ears 403; an adjustment bolt 410 pass through the installation holes 404 and the corresponding second installation holes 406 connecting each horizontal supporting pillar with the windowsill connection assembly; the diagonal bracing rack comprises an inclined supporting rack 411 and a wall supporting plate 412 fixedly mounted at a bottom end of the inclined supporting rack 411; a triangular supporting ear 413 is mounted at an upper portion of each of two side panels of the inclined supporting rack 411; two upper adjustment holes 414 are provided on each triangular supporting ear 413, and the two upper adjustment holes 414 are arranged in a staggered manner with respect to the corresponding adjustment holes 402; the triangular supporting ears 413 are mounted in the slot of each of the horizontal supporting pillars; a second adjustment bolt 415 passes through a pair of adjustment holes at two side panels of the slot of each horizontal supporting pillar and a pair of corresponding upper adjustment holes 414; a spirit level 416 is mounted on a top surface of each horizontal supporting pillar; the height forming block 408 is made of plastic; each height forming block 408 has a height of 0.4-0.41 inch and a width of 0.95-1 inch; adjustment of a distance between two adjacent adjustment holes 402 and a distance between the corresponding upper adjustment holes 414 cause each C shaped horizontal supporting pillar to tilt less than 1.5 degrees with respect to the level ground.

Since the width of the height forming block 408 has a width of 0.95-1 inch, the present invention is suitable to be used in a mounting environment having a tiny windowsill. The present invention can be mounted on a tiny space between inner and outer windows having a width of 1 inch, or it can be mounted in a slot of an outer frame of a window. The U shaped mounting plates 405 and the horizontal supporting pillars are connected by adjustment bolts 410 so as to be suitable for use where windowsill outside the window has a level or inclined mounting surface. Each inclined supporting rack 411 is inserted between two side panels of the each C shaped horizontal supporting pillar; the inclined supporting rack 411 slides towards the wall surface so that the plastic gasket of the wall supporting plate 412 can tightly engage the wall surface; each horizontal supporting pillar is positioned parallel to the level ground; a pair of upper adjustment holes 414 is selected for a corresponding pair of adjustment holes 402, and the pair of upper adjustment holes 414 and the corresponding pair of adjustment holes 402 are passed through by the second adjustment bolt 415 so that the horizontal supporting pillars are positioned parallel to the level ground; changing the upper adjustment holes 414 to be passed through by the second adjustment bolt causes the corresponding horizontal supporting pillar to be tilted less than 1.5 degrees with respect to the level ground, thereby achieving stable installation.

The present invention is reliable, convenient to install and uninstall, and has a compact structure, thereby increasing the efficiency of installing an air conditioner.

The embodiments described above are only the preferred embodiments of the present invention. The above description does not limit the present invention. Any amendments, modifications and adaptation having equivalent technical effects made within the spirit and principle of the present invention should also fall within the scope of protection of the present invention.

What is claimed is:

1. A window type air conditioner rack, comprising an upper frame main rack and a diagonal bracing rack inserted to the upper frame main rack; the diagonal bracing rack is adjustably fixed inside the upper frame main rack;

the upper frame main rack comprises a windowsill connection assembly and horizontal supporting pillars fixedly mounted to the an outer side of the windowsill connection assembly;

the diagonal bracing rack has two identical sides, and each side comprises a U shaped plate forming a slot with an opening facing upwardly and a support rack provided at a bottom outer side of the U shaped plate; a bottom end of the support rack is fixedly mounted with a wall supporting plate;

the horizontal supporting pillars comprise a left horizontal supporting pillar and a right horizontal supporting pillar which are arranged in parallel and are structurally the same;

one end of the left horizontal supporting pillar and one end of the right horizontal supporting pillar are each welded to an upper side of an upper plate of a corresponding vertical bended plate;

said one end of the left horizontal supporting pillar and said one end of the right horizontal supporting pillar are fixed to the outer side of the windowsill connection assembly through the vertical bended plates; another end of the left horizontal supporting pillar and another end of the right horizontal pillar are fixedly connected with each other through a connection pillar; each of the left horizontal supporting pillar and the right horizontal supporting pillar has a C shape forming a slot having an opening that faces downwardly; two side panels of each of the left horizontal supporting pillar and the right horizontal supporting pillar are each provided with outer adjustment holes evenly arranged in intervals;

the support rack is positioned in an inclined manner; fixation holes are provided correspondingly on two side boards of the U shaped plate; a U shaped or V shaped resilient piece is provided inside the slot of the U shaped plate; two outer panels of the U shaped or V shaped resilient piece are each provided with a positioning bead; the positioning beads of the two outer panels correspond to each other; the positioning beads are inserted through the fixation holes;

when the positioning beads are pressed into inner sides of the fixation holes, and each U shaped plate is inserted into the left horizontal supporting pillar and the right horizontal supporting pillar respectively, each U shaped plate is slidable in the slot of the corresponding C shaped horizontal supporting pillar; once an outer surface of the wall supporting plate engages firmly with a wall such that the upper frame main rack is positioned horizontally parallel to the level around, the positioning beads are released and inserted into corresponding outer adjustment holes.

2. The window type air conditioner rack as in claim 1, wherein an outer side wall of the wall supporting plate is parallel to the wall; the outer side wall of the wall supporting plate is also provided with a plastic gasket; a side wall of the plastic gasket has an uneven surface.

3. The window type air conditioner rack as in claim 2, wherein the windowsill connection assembly comprises a windowsill rail, two rows of positioning holes symmetrically arranged on two ends of a side wall of the windowsill rail respectively, and a left adjustment tube and a right adjustment tube inserted to two ends of a cavity of the windowsill rail respectively; one end of the left adjustment tube and one end of the right adjustment tube facing towards each other are each positioned on an outer side thereof a second positioning bead insertable to a corresponding positioning hole.

4. The window type air conditioner rack as in claim 3, wherein the windowsill connection assembly has a length of 24-38 inches; the windowsill rail is a hollow square tube or has a C shape forming a slot; the left adjustment tube and the right adjustment tube are hollow square tubes inserted to the windowsill rail and moveable within the windowsill rail.

5. The window type air conditioner rack as in claim 4, wherein a second V shaped resilient piece is provided inside each of the left adjustment tube and the right adjustment tube; the second positioning bead is mounted on a side of the second V shaped resilient piece corresponding to the positioning holes; the second positioning beads pass through through holes of respective side walls of the left adjustment tube 33 and the right adjustment tube 34 and insert into corresponding positioning holes 32.

6. The window type air conditioner rack as in claim 3, wherein the vertical bended plate is fixed to each of a left end and right end of the windowsill rail at a side of the windowsill rail opposite to the side of the windowsill rail provided with the positioning holes.

\* \* \* \* \*